United States Patent
Qu et al.

(10) Patent No.: US 8,988,416 B2
(45) Date of Patent: Mar. 24, 2015

(54) POWER REDUCTION TECHNIQUE FOR DIGITAL DISPLAY PANEL WITH POINT TO POINT INTRA PANEL INTERFACE

(71) Applicant: Parade Technologies, Ltd., George Town, Grand Cayman (KY)

(72) Inventors: Ming Qu, Campbell, CA (US); Zhengyu Yuan, Cupertino, CA (US); Qing Yu, Santa Clara, CA (US); Xin Jin, San Jose, CA (US)

(73) Assignee: Parade Technologies, Ltd., Grand Cayman (KY)

( * ) Notice: Subject to any disclaimer, the term of this patent is extended or adjusted under 35 U.S.C. 154(b) by 82 days.

(21) Appl. No.: 13/888,222

(22) Filed: May 6, 2013

(65) Prior Publication Data

US 2014/0168187 A1    Jun. 19, 2014

Related U.S. Application Data

(60) Provisional application No. 61/737,667, filed on Dec. 14, 2012.

(51) Int. Cl.
  *G09G 5/00* (2006.01)
  *G09G 3/20* (2006.01)
  (Continued)

(52) U.S. Cl.
  CPC ............... *G09G 3/20* (2013.01); *G09G 3/3611* (2013.01); *G09G 3/3685* (2013.01); *G09G 2330/021* (2013.01); *G09G 2340/0435* (2013.01); *G09G 2370/08* (2013.01); *G06F 1/3265* (2013.01)
  USPC ........................................... 345/212; 345/87

(58) Field of Classification Search
  CPC ................................. G09G 2330/02–2330/028
  See application file for complete search history.

(56) References Cited

U.S. PATENT DOCUMENTS

| 6,300,928 B1 | 10/2001 | Kim |
| 2004/0221056 A1 | 11/2004 | Kobayashi |
| 2004/0233181 A1 | 11/2004 | Kobayashi |

(Continued)

FOREIGN PATENT DOCUMENTS

| TW | 200729122 A | 8/2007 |
| TW | 201040911 A1 | 11/2010 |

(Continued)

OTHER PUBLICATIONS

Korean Office Action, Korean Application No. 10-2012-0065984, Oct. 22, 2013, 8 pages.

(Continued)

*Primary Examiner* — Latanya Bibbins
(74) *Attorney, Agent, or Firm* — Fenwick & West LLP

(57) ABSTRACT

A system and method are disclosed to control the power consumption of column drivers in a display system. A video input signal is received which has an active video period and a vertical blanking period between frames. A timing controller transmits a first video frame to a column driver. The timing controller transmits a column driver disable command during a vertical blanking period. Prior to the subsequent active video period, the timing controller transmits a column driver enable command. The timing controller proceeds to transmit a second video frame to the column driver. In one embodiment, the timing controller determines whether to disable and enable the column driver based on a refresh rate, the refresh rate calculated by the timing controller from the video input signal.

19 Claims, 5 Drawing Sheets

(51) Int. Cl.
*G06F 1/32* (2006.01)
*G09G 3/36* (2006.01)

(56) References Cited

U.S. PATENT DOCUMENTS

| | | |
|---|---|---|
| 2005/0062699 A1 | 3/2005 | Kobayashi |
| 2005/0062711 A1 | 3/2005 | Kobayashi |
| 2005/0066085 A1 | 3/2005 | Kobayashi |
| 2009/0244052 A1 | 10/2009 | Takahashi |
| 2010/0225637 A1 | 9/2010 | Jeon et al. |
| 2010/0289945 A1* | 11/2010 | Kobayashi et al. ........... 348/441 |
| 2011/0157103 A1 | 6/2011 | Chen et al. |
| 2012/0056870 A1 | 3/2012 | Koh |

FOREIGN PATENT DOCUMENTS

| | | |
|---|---|---|
| TW | 201102990 A1 | 1/2011 |
| WO | WO 2010/131843 A2 | 11/2010 |

OTHER PUBLICATIONS

Korean Office Action, Korean Application No. 10-2012-0065984, Jul. 24, 2014, 15 pages.

Taiwan Office Action, Taiwan Application No. 101122275, Mar. 21, 2014, 12 pages.

\* cited by examiner

POWER REDUCTION TECHNIQUE FOR DIGITAL DISPLAY PANEL WITH POINT TO POINT INTRA PANEL INTERFACE

CROSS-REFERENCE TO RELATED APPLICATIONS

This application claims priority to U.S. Provisional Patent Application No. 61/737,667, filed Dec. 14, 2012, which is incorporated by reference.

BACKGROUND

1. Field of Art

The disclosure generally relates to a display device with a protocol based point to point intra-panel interface. More specifically, the disclosure relates to reducing power consumption of column drivers.

2. Description of the Related Art

In certain portable computing systems, the display subsystem consumes a significant portion of overall system power. The power consumed by the display subsystem includes both the backlight and panel electronics. A typical pixel based display includes numerous column drivers (CD) that drive a group of pixels, often a row or a column. Through multiplexing, the column drivers are able to drive any individual pixel through a unique combination of voltage source and sink. A timing controller (TCON) is used to control the column drivers and display a desired image. The column drivers drive signals to the display panel whether video information received by the TCON is currently in an active video period or vertical blanking period and consume power while driving these signals. Column drivers typically consistently drive the display of a panel regardless of the refresh rate of a video source provided to the TCON which can be power consuming and troublesome in mobile, battery dependent situations. The power consumed due to driving column drivers may consume a significant portion of power consumed by the display subsystem.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Various embodiments provide a system and method for reducing power consumption of a display device with a point to point intra-panel interface. A point to point intra-panel interface enables a timing controller to individually control the column drivers included in a display system. In addition to display data, a point to point intra-panel interface may include configuration data capable of controlling features such as the power supplied to column drivers in the display system. A reduction in power consumption is accomplished by reducing the amount of time during which column drivers are actively driving output and consuming power. A display panel timing controller (TCON) monitors the refresh rate of an incoming video signal. Depending on the current refresh rate, the TCON may instruct column drivers to temporarily power off in order to save power. Although generally described for use in conjunction with LCD based displays, the described method may also be applicable to any pixel-based display or a display with a similar configuration such as plasma based displays.

Figure 1:
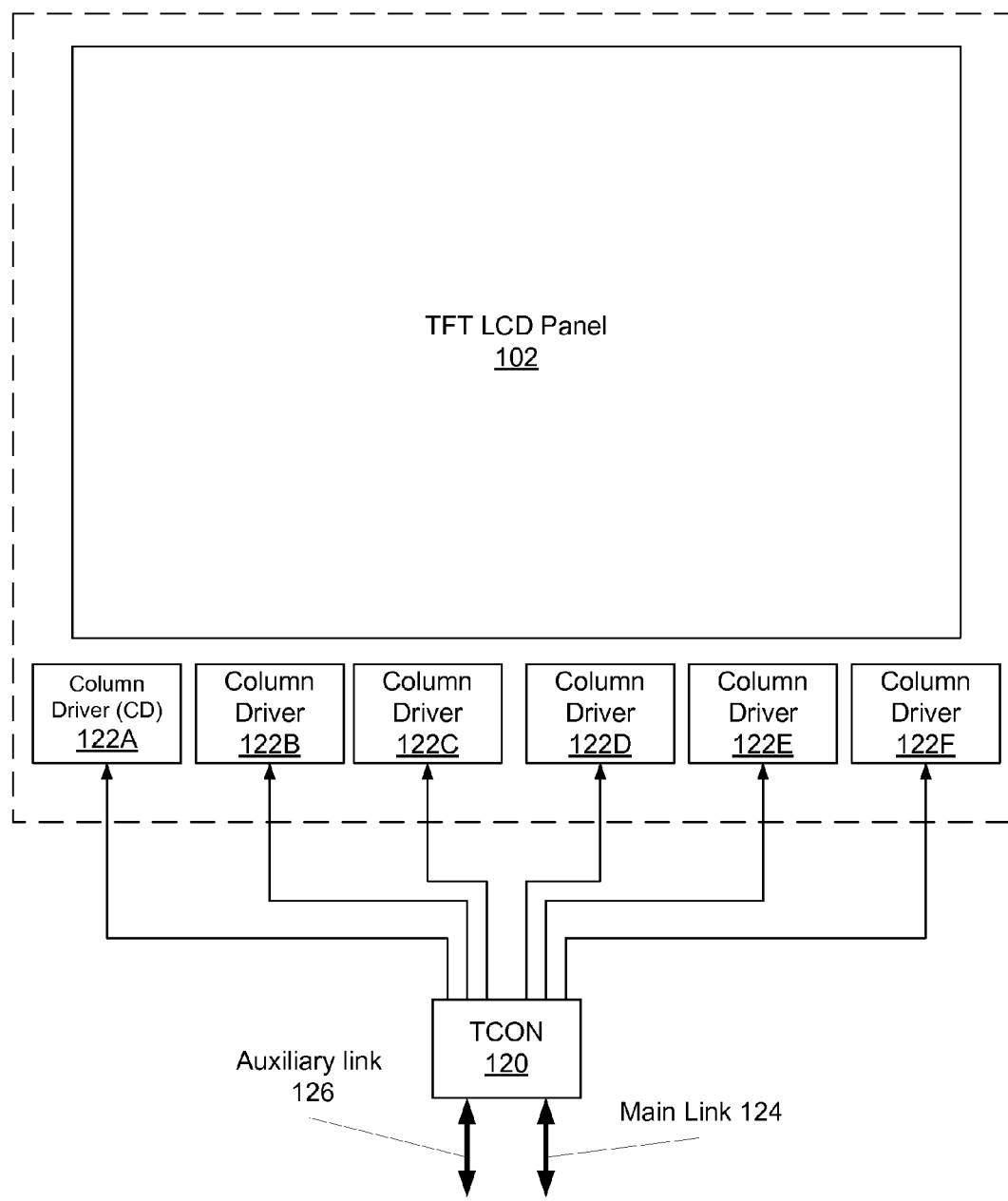
FIG. 1 is block diagram illustrating a liquid crystal display (LCD) panel subsystem including a timing controller and column drivers in accordance with one embodiment.

FIG. 1 illustrates a liquid crystal display (LCD) panel subsystem including a timing controller 120 and column drivers (CDs) 122 in accordance with one embodiment. The TCON 120 receives an input signal from an external device such as a graphic (and/or image) processing unit (GPU) over a display interface, e.g., DISPLAYPORT. The input signal may include both main link data 124 and auxiliary data 126. TCON 120 communicates with a plurality of column drivers 122A-F. While six column drivers are illustrated in FIG. 1, any number of column drivers may be included to drive a display panel. As illustrated in FIG. 1, the intra-panel interface may be the Scalable Intra Panel Interface (SIPI), for example, as described in U.S. patent application Ser. No. 13/070,416, which is incorporated by reference. Another common point to point intra-panel interface is enhanced reduced voltage differential signaling (eRVDS). Any intra panel interface may be utilized that allows a timing controller to control the power provided to column drivers through methods including disabling and enabling column driver output.

In the panel subsystem, the power consumption from the CDs 122 can be a significant portion of the power consumed by the entire panel. This is partly due to the large number of CDs that may be present in one panel depending on the panel resolution. In order to reduce column driver (CD) power consumption, the TCON 120 monitors the refresh rate of video received over the main link 124 and auxiliary link 126. When a refresh rate below a threshold is detected, the TCON 120 is configured to control the CDs 122 and reduce the power consumed by the CDs 122 by temporarily powering them off.

The storage capacitors in a liquid crystal display (LCD) panel may be capable of coping with a refresh rate lower than the 120 Hz or 60 Hz that may be provided by an input source.

For example, certain LCDs may not flicker or produce other notable artifacts with a refresh rate as low as 10 Hz or less. To take advantage of this, a column driver is turned off, or placed into a low power state between frame refreshes. Various other types of display systems including plasma, LED and any other display system with a level of capacitance may be able to benefit due to a similar effect.

Figure 4:
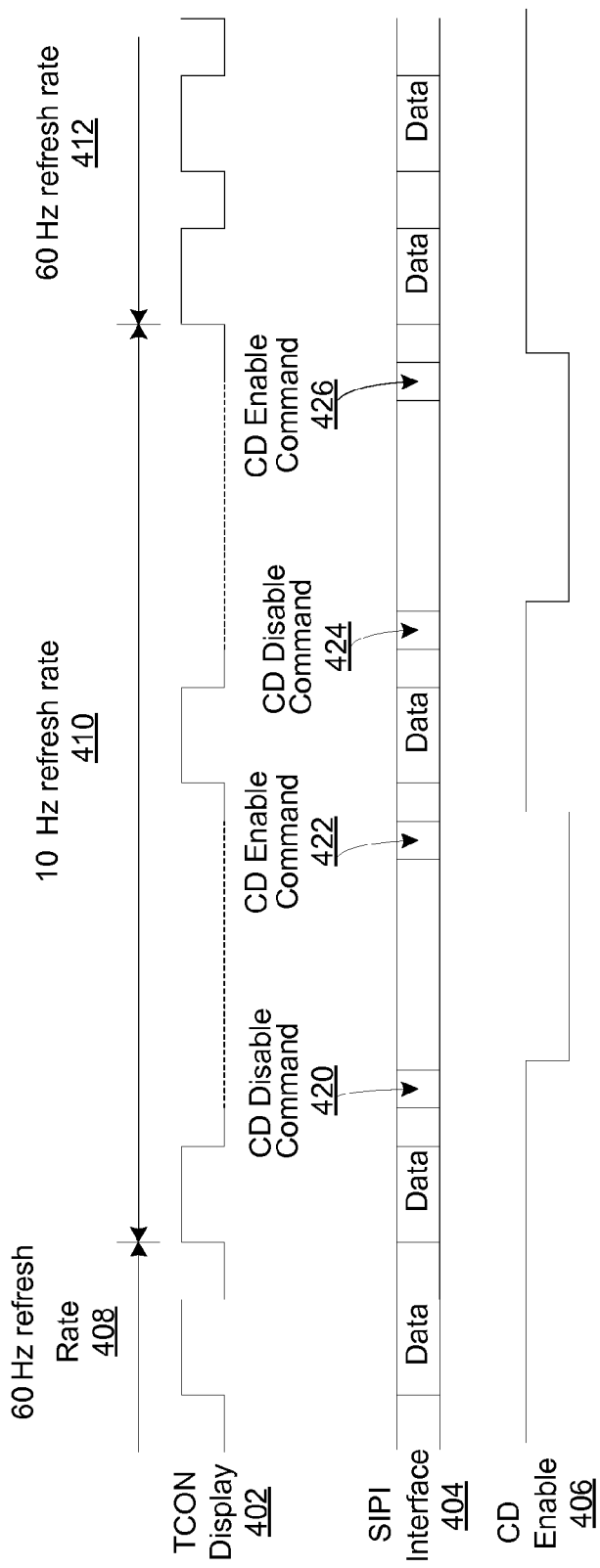
FIG. 4 illustrates an example timing diagram in accordance with one embodiment.

Rather than configuring all CDs 122 to constantly drive signals out to the LCD panel 102 both during video period and vertical blanking period of an input signal, the CDs 122 drive signals periodically based on the refresh rate of the input video determined by the TCON from main link 124 and/or auxiliary link 126. At a lower refresh rate, e.g., 10 Hz, the vertical blanking period of an input signal may be longer than the active video period. A column driver's output can then be turned off during the vertical blanking period to reduce power consumption of the column driver. In one embodiment, in order to control CDs 122 and turn on and off output, the TCON 120 generates control signals through an intra-panel interface. For example, in the SIPI protocol, there may be configuration data inside the data packet, which can be used to send commands to CDs 122. Once the TCON 120 detects a refresh rate switch, the TCON 120 generates CD ON/OFF signals and transmits the signals to CDs 122 through SIPI interface. An example of a timing diagram for CD control when the refresh rate switches from 60 Hz to 10 Hz is illustrated in FIG. 4.

Figure 2:
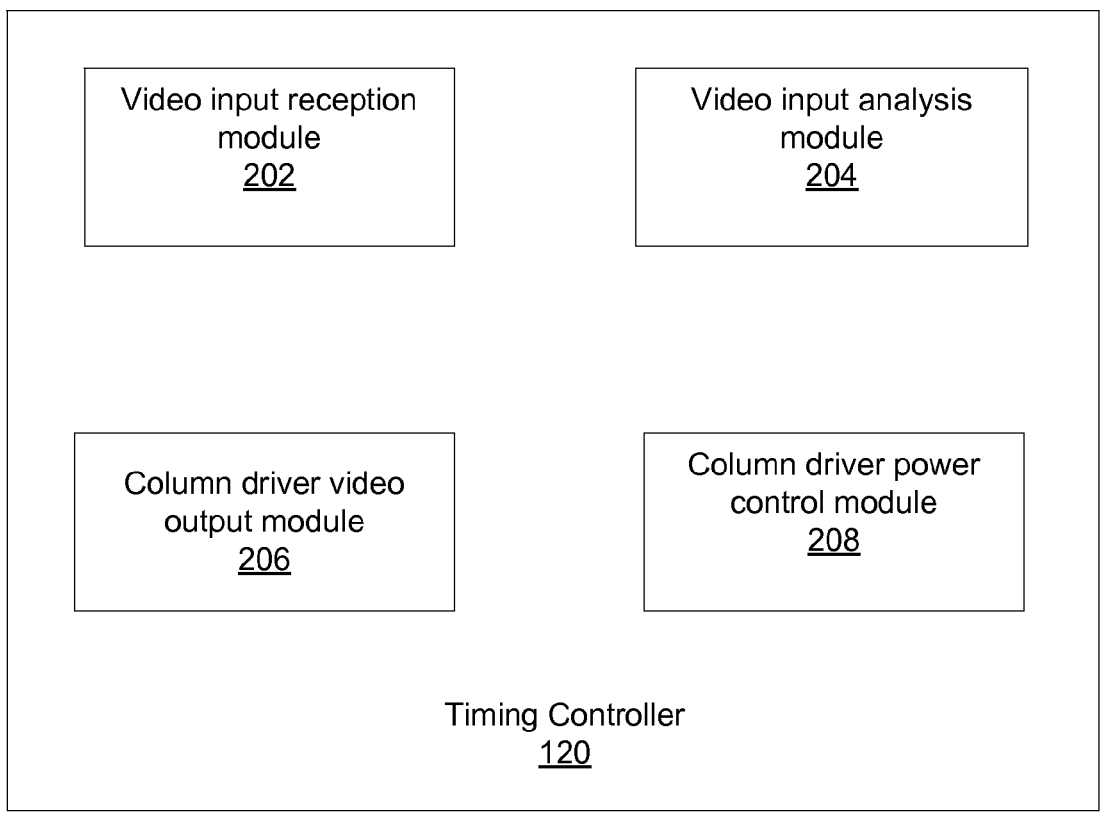
FIG. 2 is a detailed view of the timing controller of the display subsystem in accordance with one embodiment.

FIG. 2 illustrates a detailed view of the timing controller 120 of the display system in accordance with one example embodiment. The timing controller 120 includes a video input reception module 202, a video input analysis module 204, a column driver video output module 206, and a column driver power control module 208.

The video input reception module 202 is configured to receive a video signal over a video interface, e.g., DISPLAYPORT or HDMI. The TCON 120 may accept a video signal from a variety of video interface which may include a main link and/or an auxiliary link. In one embodiment, any protocol based point-to-point intra-panel interface can be utilized to control column drivers through a configuration field in a data packet. In one embodiment, the video input signal is transmitted through a packet based interface. Additionally, the refresh rate of the video signal may be explicitly identified in the main link or auxiliary link.

The video input analysis module 204 analyzes the incoming video signal to identify actions to be taken by the TCON 120. This analysis includes identification of the refresh rate of the signal. The refresh rate may be explicitly identified by the main link 124 or auxiliary link 126, or calculated by the TCON 120 based on received video data. For example, the TCON can analyze the frequency of video frames transmitted via the main link 124. The TCON can generate control timing information based on the input signal from a GPU or other source device. The column driver video output module 206 transmits to each CD at least the video data required for each CD to display its portion of a video frame. Based on the refresh rate identified by the video input analysis module, the TCON determines whether to power off one or more column drivers 122. In one embodiment, the TCON may power off one or more column drivers 122 regardless of refresh rate.

The column driver power control module 208 powers off one or CDs or instructs one or more CDs to enter a lower power state than when actively driving the panel. The column driver disable signal is typically transmitted during a vertical blanking period, or a period of time between frames of video. Subsequently, a column driver enable signal is transmitted prior to the vertical blanking period ending and the next video frame being transmitted to the column driver. Thus, power consumption is reduced while the column driver is disabled. This process is generally repeated during each vertical blanking period. The TCON 120 may recalculate the current refresh rate as often as each vertical blanking period, or less frequently. After recalculating the current refresh rate, the TCON may adjust whether or not the column driver disable and enable signals are transmitted during an upcoming vertical blanking period.

Additionally, while all column drivers are typically disabled or enabled as a group according to the refresh rate of the video as a whole, a subset of column drivers may be disabled and enabled during a video blanking period. In one embodiment, the TCON 120 identifies certain areas of a video frame that have not changed from previous frames as low activity areas. Similarly, areas of a video frame that show significant change are identified as high activity areas. The TCON 120 can then leave the column drivers associated with high activity areas active and disable column drivers associated with low activity areas. To allow sufficient time to disable the low activity area column drivers and save power, the TCON 120 can refrain from sending one or more video frames to the low activity area column drivers that would have no, or minimal, effect on the resulting video display.

Figure 3:
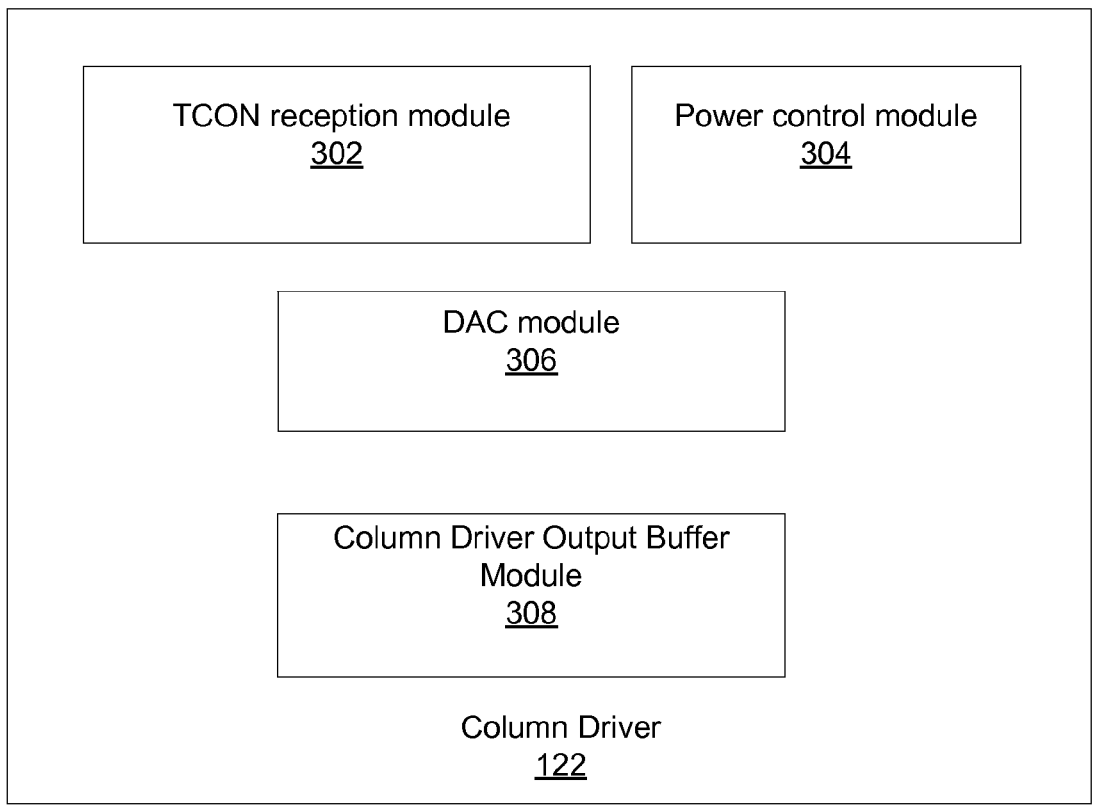
FIG. 3 is a detailed view of a column driver of the display subsystem in accordance with one embodiment.

FIG. 3 illustrates a detailed view of a column driver in accordance with one example embodiment. The column driver includes a TCON video reception module 302, a power control module 304, a digital-to-analog converter (DAC) module 306 and a column driver output buffer module 308. The TCON reception module 302 of a CD is configured to receive video data from the column driver video output module of the TCON designated for that specific CD. The power control module 304 controls the power state of a CD based on instructions received from the TCON. For example, during a vertical blanking period of the video input signal, the TCON may instruct the CD to disable, i.e., enter a state which consumes less power and ceases to drive the panel. Subsequently, the CD may receive a column driver enable signal from the TCON 120 resulting in the CD resuming normal operations with the capability of driving output to display video frame pixels. The DAC module 306 processes information received by the TCON video reception module and prepares analog data that will be output by the column driver to drive the panel. Finally, a column driver output buffer module 308 may be included to buffer the output of the column driver and proceeds with producing the desired output.

FIG. 4 illustrates an example timing diagram in accordance with one example embodiment. The TCON display signal 402 indicates when a frame received by the TCON over the video input interface, e.g., SIPI interface, is to be displayed on the panel. The SIPI Interface signal 404 is controlled by the TCON and includes both active display video data and control data or dummy signal data. Any other point to point intra-panel interface may be used in place of SIPI. The CD enable and disable signals are included in the configuration data transmitted over the SIPI interface 404. The CD enable 406 signal is transmitted from the TCON to a column driver instructing the column driver whether it should currently drive the panel. When the CD enable signal is low, the CD receiving that signal turns off or enters a low power state. The CD enable signal may be common to all of the CDs or each CD may have its own CD enable signal.

In the 60 Hz refresh rate period 408 the SIPI interface transmits video frames at 60 Hz and the TCON leaves the CD enable signal high to allow the CDs to continue to drive the panel with new frames of video. In the 10 Hz refresh rate period 410, the SIPI interface transmits frames at a lower 10

Hz and the TCON lowers the CD enable 406 signal during vertical blanking periods between frames of video frames transmitted over the TCON display signal 402. In one embodiment, the CDs are disabled during the vertical blanking period when the refresh rate falls below a threshold value. In the example embodiment of FIG. 4, the threshold value is somewhere between 10 Hz and 60 Hz.

The CDs of the panel system consume less power between frames when the refresh rate falls below a threshold value, causing the CD enable signal to go low between frames. When the SIPI interface signal 404 again transmits at a high refresh rate, e.g., 60 Hz refresh rate period 412, the TCON keeps the CD enable signal high between frames to ensure that the column drivers can drive each frame received for display. The 60 Hz is used as merely an example refresh rate. In certain embodiments, it may prove beneficial for the refresh rate threshold to be higher than 60 Hz resulting in column drivers being disabled and re-enabled between frames at 60 Hz.

Figure 5:
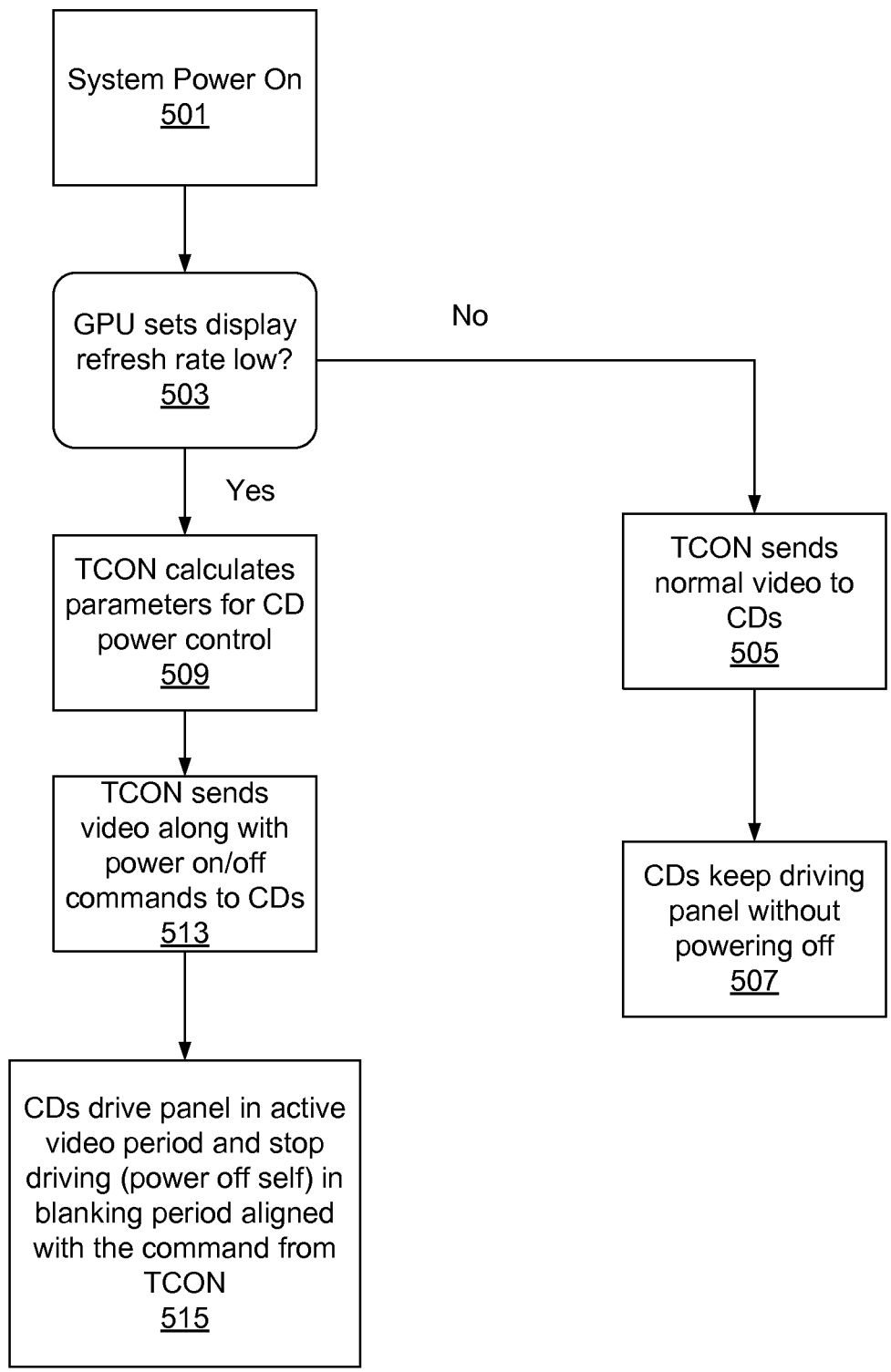
FIG. 5 illustrates a flow chart implementing the power saving technique in accordance with one embodiment.

FIG. 5 illustrates a flow chart implementing the power saving technique in accordance with one example embodiment. The system powers on 501 to begin driving a display with CDs. The TCON determines whether 503 the GPU, or other input source, sets the display refresh rate below a threshold value. If the refresh rate is not below the threshold, the TCON continues 505 to send normal video control signals to the column drivers and the CDs continue to drive 507 the panel without powering off between frames.

If the refresh rate is below the threshold, the TCON calculates 509 parameters to control the power of CDs. For example, the TCON may calculate which CDs should be powered off, if not all, and may calculate the parameters to properly time the powering off and on off CDs between frames and during vertical blanking periods. In one embodiment, all CDs are powered off during a vertical blanking period and powered on at or before a subsequent active video period. The TCON is configured to disable CDs for a predetermined time period. The predetermined time period is based on the amount of time between video frames that are sent to the CDs for display. In one embodiment, the predetermined time period becomes longer as the refresh rate decreases. The timing of powering off and on CDs may differ for different CDs. The TCON sends video data 513 to the CDs along with power on/off commands to the CDs. The CDs drive 515 the panel in the active video period and stop driving, or power off, in the blanking period between active video periods as instructed by commands from the TCON. The process may be repeated between each frame received over the video input looping back to step 503. By reassessing the current refresh rate, the TCON may determine whether to continue with the current process, whether that is power cycling certain column drivers between video frames or leaving column drivers enabled between video frames.

Additional Considerations

The disclosed system and method beneficially reduce power consumption of column drivers in a display system. The column drivers in a display system are powered off between frames of a video in order to reduce power consumption. The power savings are then increased as the refresh rate of a display is lowered, with the column drivers powered off for a larger percentage of time. Decreasing the power consumption of display systems is particularly important in portable battery powered devices, which may gain increased battery life through powering off column drivers between frames.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules, for example, as described with FIG. 2, or FIG. 3, may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method for power reduction in an intra-panel point to point interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method for controlling plurality of column drivers of a display panel, the method comprising:
   receiving a video input signal comprising video frames;
   determining a refresh rate from the video input signal;
   transmitting a first video frame to a column driver of the plurality of column drivers, the first video frame calculated based on the video input signal;
   transmitting a column driver disable command to the column driver responsive to the determined refresh rate being below a refresh rate threshold;
   transmitting a column driver enable command to the column driver after a predetermined time period; and
   transmitting a second video frame to the column driver after transmitting the column driver enable command, the second video frame calculated based on the video input signal.

2. The method of claim 1, wherein the video input signal is received using a main link.

3. The method of claim 2, wherein the refresh rate is determined from the video input signal received using the main link.

4. The method of claim 1, wherein the column driver disable command and the column driver enable command are transmitted during a vertical blanking period between two active video periods.

5. The method of claim 1, wherein the column driver disable command and, after the predetermined time period~the column driver enable command are transmitted to the column driver between subsequent video frames received via the video input signal.

6. The method of claim 5, wherein the refresh rate is recalculated from the video input signal as subsequent video frames are received.

7. The method of claim 6, wherein the predetermined time period increases responsive to the refresh rate decreasing after recalculation.

8. The method of claim 1, wherein the column driver disable command and column driver enable command are transmitted via a point to point intra panel interface.

9. The method of claim 1, wherein transmitting the column driver disable command to the column driver results in turning off an output of the column driver.

10. A system for controlling a plurality of column drivers of a display panel, the system comprising:
    a video reception module configured to receive a video input signal comprising video frames;
    a video input analysis module configured to determine a refresh rate from the video input signal;
    a column driver video output module configured to transmit a first video frame to a column driver of the plurality of column drivers, the first video frame calculated based on the video input signal, and transmit a second video frame to the column driver after transmitting a column driver enable command, the second video frame calculated based on the video input signal; and
    a column driver power control module configured to transmit a column driver disable command to the column driver responsive to the refresh rate being below a refresh rate threshold and subsequently transmit the column driver enable command to the column driver after a predetermined time period.

11. The system of claim 10, wherein the video input signal is received using a main link.

12. The system of claim 11, wherein the refresh rate is determined from the video input signal received using the main link.

13. The system of claim 10, wherein the column driver disable command and the column driver enable command are transmitted during a vertical blanking period between two active video periods.

14. The system of claim 10, wherein the column driver disable command and, after the predetermined time period, the column driver enable command are transmitted to the column driver between subsequent video frames received via the video input signal.

15. The system of claim 14, wherein the refresh rate is recalculated from the video input signal as subsequent video frames are received.

16. The system of claim 15, wherein the predetermined time period increases responsive to the refresh rate decreasing after recalculation.

17. The system of claim 10, wherein the column driver disable command and column driver enable command are transmitted via a point to point intra panel interface.

18. The system of claim 10, wherein transmitting the column driver disable command to the column driver results in turning off an output of the column driver.

19. A non-transitory computer readable medium storing computer-executable instructions for controlling a plurality of column drivers of a display panel that, when executed by a processor, cause the processor to:

receive a video input signal comprising video frames;

determine a refresh rate from the video input signal;

transmit a first video frame to a column driver of the plurality of column drivers, the first video frame calculated based on the video input signal;

transmit a column driver disable command to the column driver responsive to the determined refresh rate being below a refresh rate threshold;

transmit a column driver enable command to the column driver after a predetermined time period; and transmit a second video frame to the column driver after transmitting the column driver enable command, the second video frame calculated based on the video input signal.

* * * * *

UNITED STATES PATENT AND TRADEMARK OFFICE
CERTIFICATE OF CORRECTION

PATENT NO. : 8,988,416 B2  
APPLICATION NO. : 13/888222  
DATED : March 24, 2015  
INVENTOR(S) : Ming Qu et al.

Page 1 of 1

It is certified that error appears in the above-identified patent and that said Letters Patent is hereby corrected as shown below:

IN THE CLAIMS

Column 8, line 23, delete "the predetermined time period~the" and insert --the predetermined time period, the--.

Signed and Sealed this  
Sixteenth Day of February, 2016

Michelle K. Lee  
*Director of the United States Patent and Trademark Office*